United States Patent [19]
Wettengel et al.

[11] Patent Number: 5,080,459
[45] Date of Patent: Jan. 14, 1992

[54] MOUNTING ASSEMBLY FOR OPTICAL EQUIPMENT

[75] Inventors: Paul F. Wettengel, Ipswich; Peter D. Jenkins, Woodbridge, both of England

[73] Assignee: British Telecommunications public limited company, Great Britain

[21] Appl. No.: 476,385
[22] PCT Filed: Dec. 22, 1988
[86] PCT No.: PCT/GB88/01120
§ 371 Date: May 31, 1990
§ 102(e) Date: May 31, 1990
[87] PCT Pub. No.: WO89/05989
PCT Pub. Date: Jun. 29, 1989

[30] Foreign Application Priority Data
Dec. 23, 1987 [GB] United Kingdom ............... 8729952

[51] Int. Cl.[5] .................. G02B 6/26; B65D 85/38
[52] U.S. Cl. ............................ 385/95; 206/558; 206/316.1; 385/135
[58] Field of Search ........... 350/96.20, 96.21, 96.22, 350/96.23, 96.24; 206/472, 484.2, 484, 558, 565, 316.1

[56] References Cited

U.S. PATENT DOCUMENTS

| | | | |
|---|---|---|---|
| 4,266,853 | 5/1981 | Hutchins et al. | 350/96.20 |
| 4,332,435 | 6/1982 | Post | 350/96.20 |
| 4,418,982 | 12/1983 | Williams | 350/96.20 |
| 4,478,486 | 10/1984 | Fentress et al. | 350/96.20 |
| 4,648,168 | 3/1987 | Nolf et al. | 350/96.20 |
| 4,792,203 | 12/1988 | Nelson et al. | 350/96.20 |
| 4,812,004 | 3/1989 | Biederstedt et al. | 350/96.20 |
| 4,818,054 | 4/1989 | George et al. | 350/96.20 |
| 4,832,436 | 5/1989 | Goto et al. | 350/96.20 |
| 4,884,863 | 12/1989 | Throckmorton | 350/96.20 |
| 4,962,989 | 10/1990 | Jung et al. | 350/96.20 |
| 4,971,421 | 11/1990 | Ori | 350/96.20 |

FOREIGN PATENT DOCUMENTS

| | | | |
|---|---|---|---|
| 810224 | 2/1981 | Canada | 350/96.20 X |
| 2559916 | 8/1985 | France | 350/96.20 X |
| 2577688 | 8/1986 | France | 350/96.20 X |
| 59-67510 | 4/1984 | Japan | 350/96.21 X |

OTHER PUBLICATIONS

Kobayashi et al., "Design and Characteristics of Optical Cable . . . ", Rev. of Elect. Comm. Lab., vol. 32, No. 4, 1984, pp. 665-675.
Takagi et al., "A New Optic Slack Fiber . . . Splices", IECE of Japan, vol. E 69, No. 4, 4/86, pp. 363-364.

Primary Examiner—Brian Healy
Attorney, Agent, or Firm—Nixon & Vanderhye

[57] ABSTRACT

A mounting assembly (1) for optical equipment comprises a plurality of trays (2) detachably hinged together. Each tray (2) may be adapted to carry optical components as well as optical fibre splices and they can be hinged together into a stack in one of a number of different configurations, allowing convenient access for both installation and maintenance. The assembly (1) finds particular application in optical communications equipment.

13 Claims, 5 Drawing Sheets

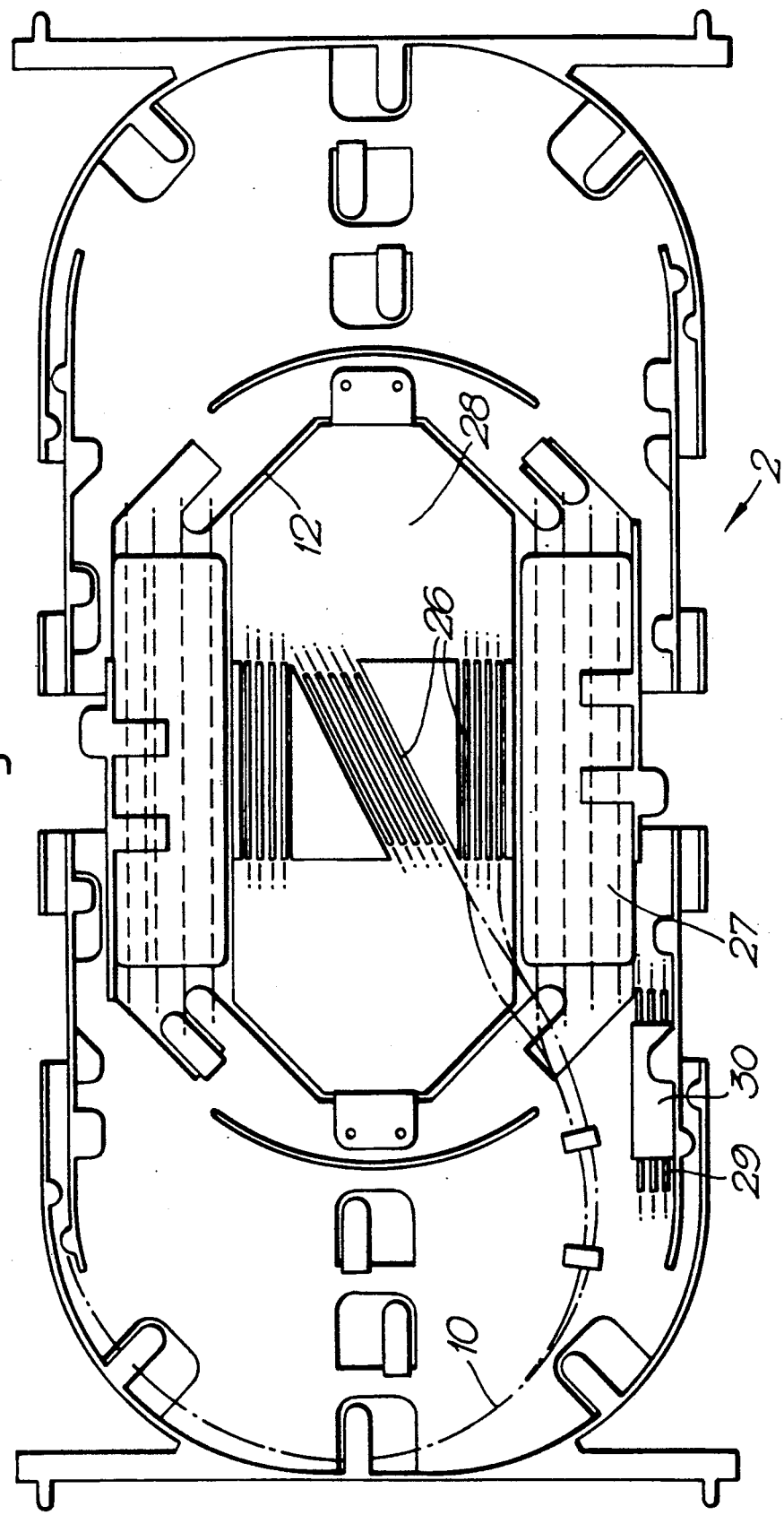

MOUNTING ASSEMBLY FOR OPTICAL EQUIPMENT

BACKGROUND OF THE INVENTION

The present invention relates to a mounting assembly for optical equipment. In particular it relates to a multiple tray storage system for use in optical communication systems.

It is known in the field of optical communications to mount optical components, such as opto-electronic components, on boards. One or two components may be mounted on a board, with associated circuitry, and there is commonly an associated fibre splice organiser tray. The splice organiser tray accommodates the splices between optical fibre tails attached to individual components, and optical fibres carrying signals to or away from those components. Each fibre splice necessarily has a length of spare fibre associated with it so that the splice can be broken and remade as required. This spare fibre is also stored on the splice organiser tray.

Where several splice organiser trays are required, they may conveniently be hinged together into a stack. This gives a relatively compact storage arrangement, access to particular trays being made possible by the hinges which allow the stack to be opened like a book.

SUMMARY OF THE INVENTION

It has now been realised, in making the present invention, that it is possible to design a mounting assembly for optical equipment which is particularly versatile and convenient with regard to component access.

It is object of the present invention to provide a mounting assembly for optical equipment which can provide good access to the equipment, for instance for either installation or maintenance.

It has been found that a mounting assembly according to an embodiment of the present invention can also simplify the provision of optical fibre tails to components, and the storage of associated fibre splices.

According to a first aspect of the present invention there is provided a mounting assembly for optical equipment comprising a plurality of trays which can be stacked, the trays being provided with means for mounting optical components, wherein the trays are further provided with detachable connecting hinges such that the trays can be hingedly connected together in a selected one of a plurality of different configurations.

By using detachable connecting hinges it is possible to increase greatly the versatility of a mounting assembly. This has major advantages. For instance, if the trays each have effectively two opposing edges and can be stacked so that the edges are aligned, by providing detachable connecting hinges at both edges of the trays it becomes possible to select a configuration in which a stack of trays can be opened either like a book, each tray constituting a page of the "book", or, by reconfiguring the hinges, in a zig-zag fashion. This is useful at installation because the opening the stack zig-zag fashion it is possible to expose a single large surface on which optical components and their associated fibre splices and spare fibre can be optimally arranged. However it is also subsequently useful in maintenance because by reconfiguring the hinges the stack can then be opened like a book to expose any selected component with minimal disturbance to the rest of the stack.

Preferably, instead of there being a splice organiser tray on which a plurality of optical fibre splices are arranged, each component having an associated fibre splice is mounted on a tray with that splice.

According to a second aspect of the present invention there is provided a tray for use in a mounting assembly according to the first aspect of the present invention, which tray is provided with means for mounting at least one optical component and for mounting a fibre splice associated with that component.

This has obvious advantages for maintenance purposes in an assembly according to the present invention since where it becomes possible to open a stack of trays selectively at a particular component, it is clearly advantageous that an associated fibre splice is also immediately accessible so that the component can be conveniently replaced if necessary. It also has the advantage that because the component and splice are on a common tray, there is no need to provide a ruggedised fibre tail from the component to the splice. This has been necessary in the past to protect the fibre tail where it is being taken between two separate and relatively movable storage arrangements, these being a component board and a splice organiser tray.

BRIEF DESCRIPTION OF THE DRAWINGS

A mounting assembly for optical equipment will now be described, by way of example only, with reference to the accompanying Figures in which:

FIG. 9 shows a plan view of another alternative tray to that of FIG. 2.

It should be noted that where a cross section is shown in the Figures, instead of being hatched the cross section portions are shown as a solid area.

DETAILED DESCRIPTION OF EXEMPLARY EMBODIMENTS OF THE INVENTION

Figure 1A:
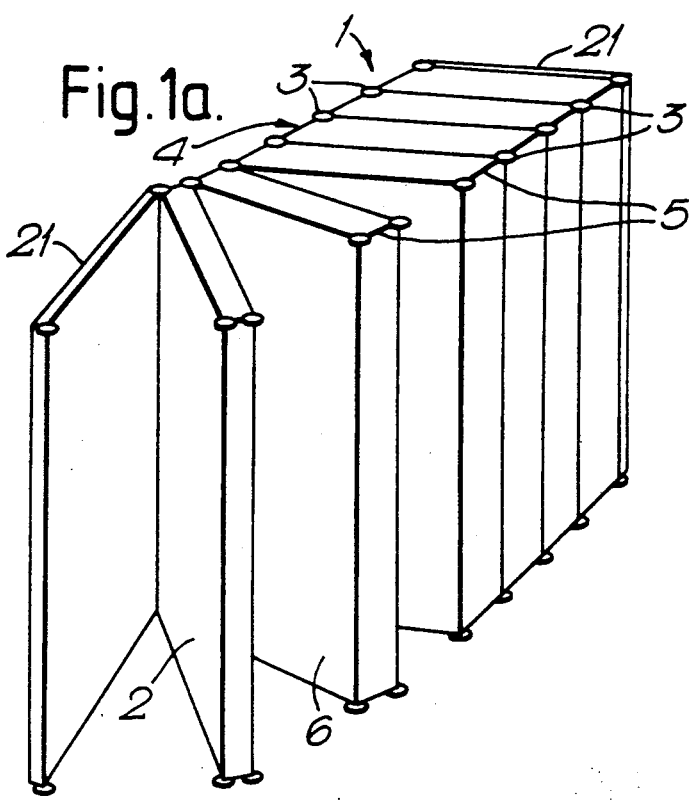
FIGS. 1a and 1b show the mounting assembly, schematically, in each of two different hinge configurations.
Figure 1B:
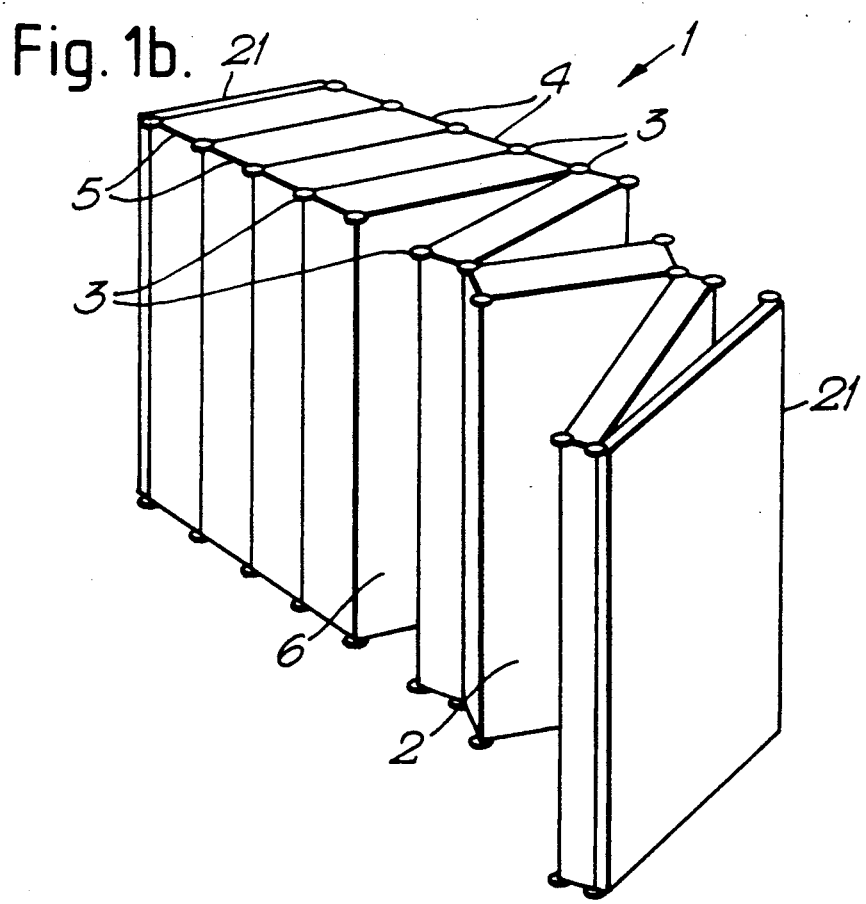

Referring to FIGS. 1a and 1b, the mounting assembly 1 comprises a plurality of trays 2 with demountable hinges 3 at their corners. The trays 2 are stacked together, adjacent trays 2 being attached to each other by means of the hinges 3. At each end of the assembly 1, a cover 21 is provided.

Two alternative configurations are shown, in FIGS. 1a and 1b respectively. In a first configuration, shown in FIG. 1a, each of the trays 2 is hinged to each adjacent tray 2 at the same edge 4 with respect to the stack. The opposing edge 5 of each tray 2 is unattached. Hence the stack can be opened like a book, between any pair of adjacent trays, each tray 2 consituting a page of the "book". This gives access to either face 6 of all the trays 2 in the assembly 1.

In a second configuration, shown in FIG. 1b, each of the trays 2 is hinged to its adjacent trays at alternate edges 4, 5 with respect to the stack. Hence the stack can be opened zig-zag fashion to expose a preselected surface area. That area may range from being as small as the area of the faces 6 of two adjacent trays 2, to being as large as the total area of one side of all the trays 2, put together, if the asssembly 1 is fully opened out.

By using demountable hinges 3, it is possible to go from one configuration to the other, and indeed to any further configuration required, which might be a combination of the first and second. This can be achieved simply by disconnecting certain hinges 3 and connecting a different combination.

The trays 2 and the hinges 3 will now be described in more detail, with reference to FIGS. 2, 3 and 4.

Figure 2:
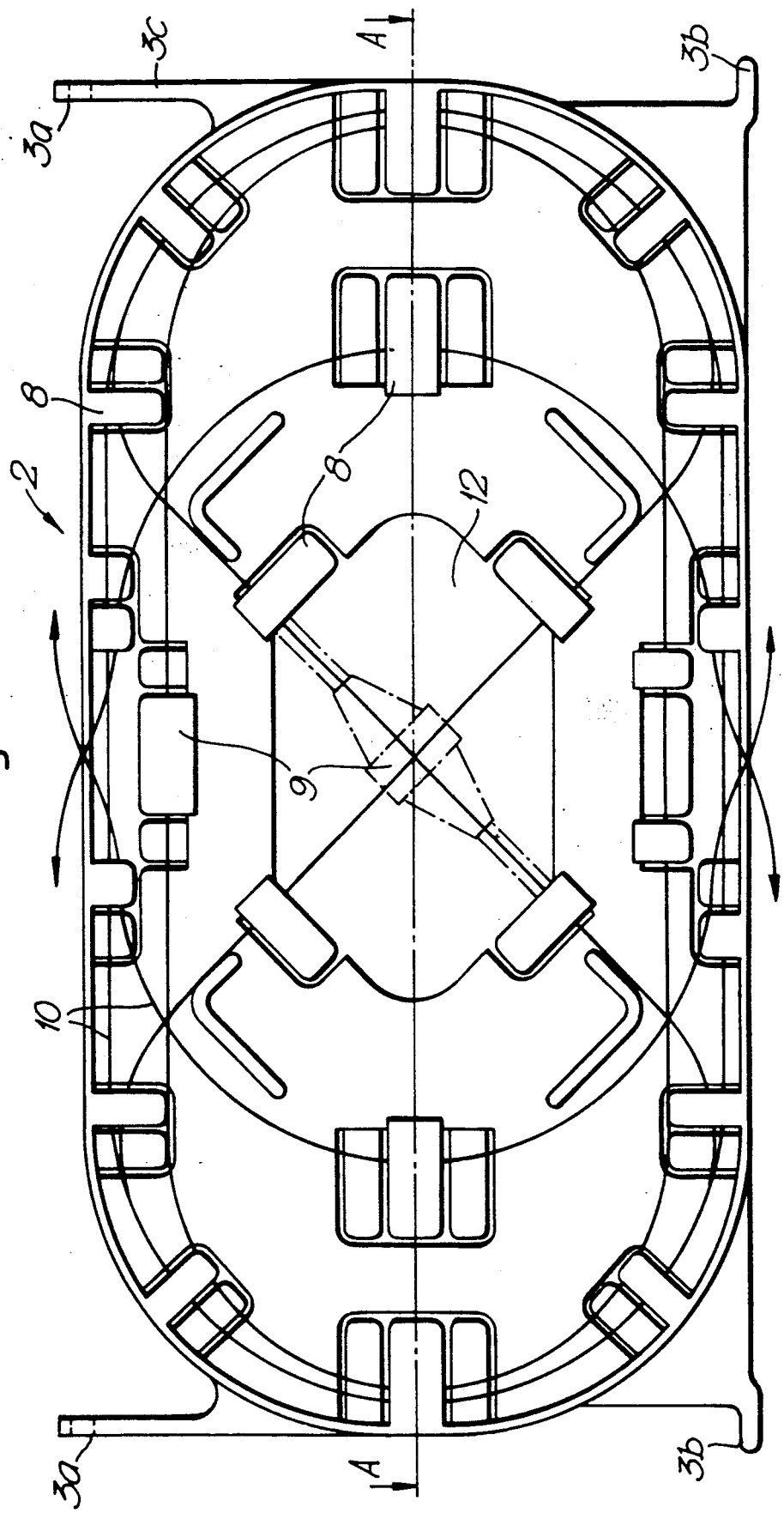
FIG. 2 shows a plan view of a tray for use in the mounting assembly of FIG. 1.
Figure 3:
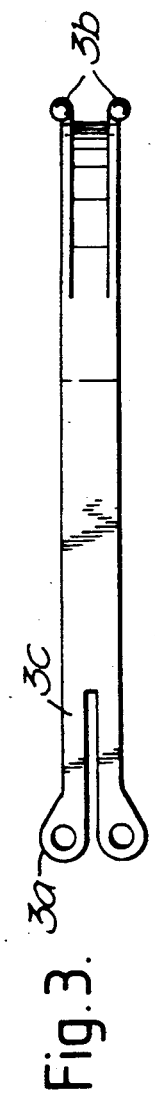
FIG. 3 shows an end elevation of the tray of FIG. 2.

Referring to FIG. 2, each tray 2 comprises substantially a moulded plastic plate provided with optical fibre guides 8 and with mounting points for components 9. Optical fibre 10 can be brought onto the tray 2 at either long side, the tray 2 being roughly rectangular with rounded corners. The fibre 10 is guided and retained on the tray 2 by means of fibre guides 8, spare fibre being stored around the edge of the tray 2.

At each corner of the tray 2 are the detachable connecting hinges 3. Referring to FIG. 3, each hinge 3 comprises two complementary parts 3a, 3b, mounted on respective trays 2 so that when the trays 2 are stacked together, a hinge part 3a on one tray 2 can be connected with a complementary hinge part 3b on the adjacent tray 2 to complete a detachable connecting hinge 3. The hinge parts 3a, 3b comprises a collar 3a and a peg 3b respectively, the peg 3b fitting into the collar 3a to complete a hinge 3. The collar 3a in each case is mounted on a slightly resilient neck 3c, this allowing the hinge 3 to be either made or unmade.

Figure 4:
FIG. 4 shows a cross section taken along the line A—A of FIG. 3, viewed in the direction indicated by the arrows.

Referring to FIGS. 2 and 4, the tray 2 is provided with mounting points 9 for components (not shown) of different types. The centre 12 of the tray is hollow and can accommodate a component whose depth is of the same order as that of the tray 2, without the component protruding from the tray 2. Towards the edge of the tray 2 are provided further mounting points 9 which can accommodate shallower components, on either face. Other mounting points may also be provided.

It would be possible to accommodate particularly large components by using adjacent trays 2 in an assembly with complementary cut-out sections, or depressions, which co-operate to provide a suitable cavity.

The dimensions of each tray 2 ar 10×21×1 cm. This allows the optical fibre to be guided round curves of minimum bend radius 3.5 cm. The fibre enters and leaves the tray 2 at a long side 22 of the tray 2.

Figure 5:
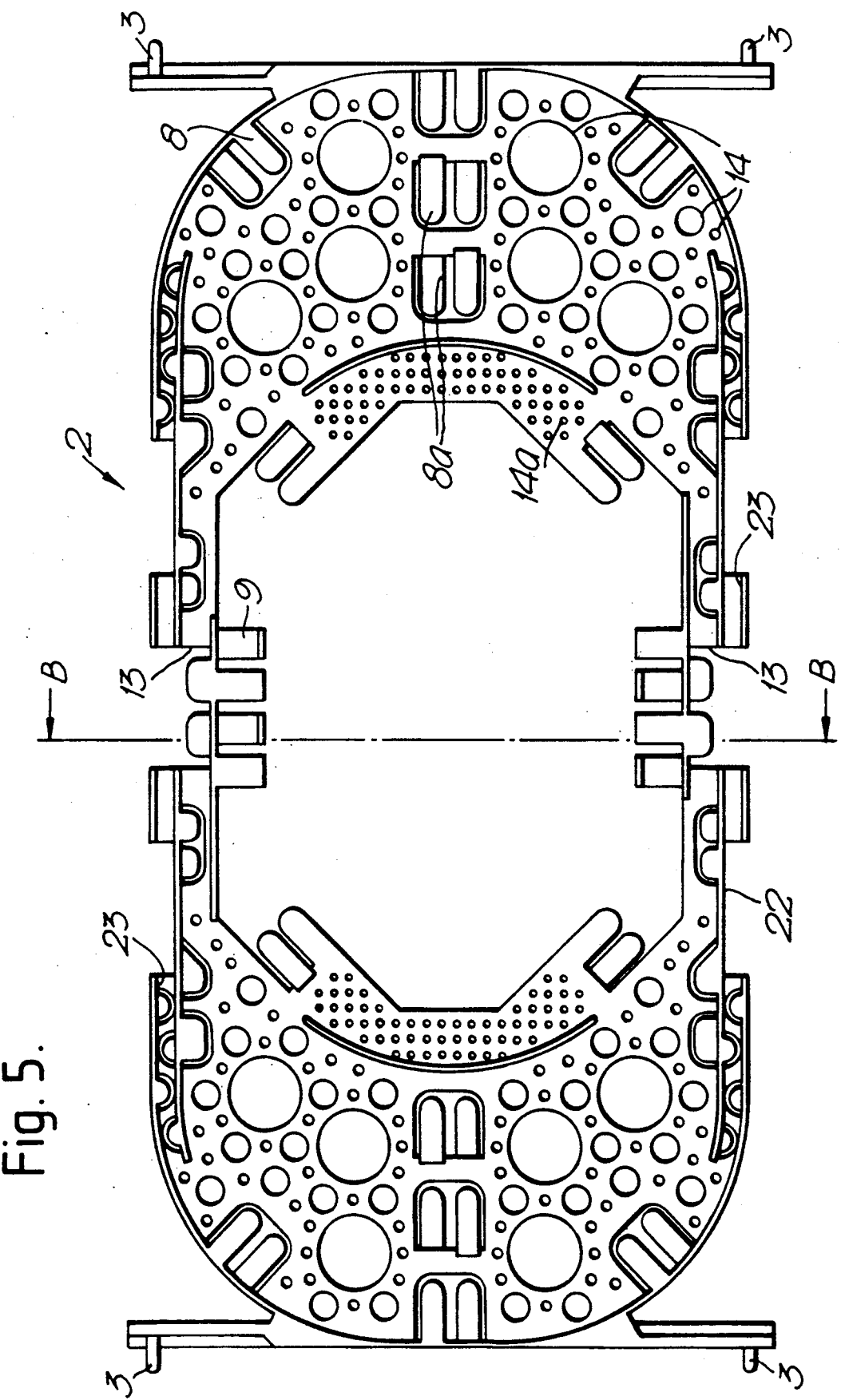
FIG. 5 shows a plan view of an alternative tray to that of FIG. 2.

Referring to FIG. 5, a tray 2 may have a number of alternative features.

When two adjacent trays 2 are hinged together, clearly any fibre going from one tray 2 to the other must do so at the long side between the hinges 3. To avoid overbending the fibre during manipulation of a tray assembly, the fibre is guided so that it enters or leaves a tray 2 following a line which is substantially along the hinge axis. It is convenient to provide cutouts 13 at the point where a fibre enters or leaves a tray 2. This allows a fibre to go easily from one face to the other of a particular tray 2, or to be led onto either face of a tray 2, from elswhere. To improve guidance of the fibre, as well as fibre guides 8, channels 23 may be provided particularly at the long sides 22 of a tray 2.

The trays 2 may be provided with a multiplicity of holes 14 of different sizes. The smallest of these 14a are equivalent to the conventional holes provided on a printed circuit board. This allows standard mounting techniques for electrical components to be applied. The other holes 14 may be used for instance to mount components, or to insert detachable optical fibre guides 8a so that the configuration of optical fibres on the tray can be changed in a flexible manner.

Figure 6:
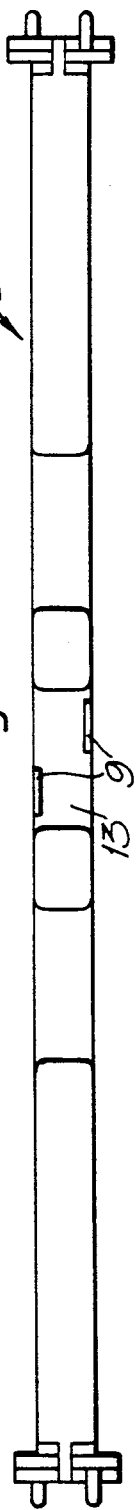
FIG. 6 shows a side elevation of the tray of FIG. 5.
Figure 7:
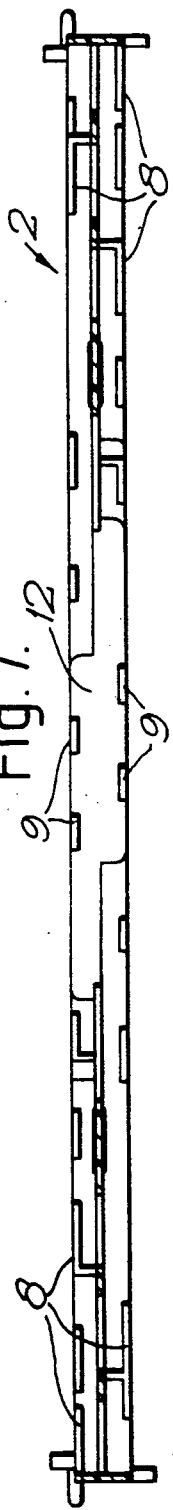
FIG. 7 shows a cross section of the tray of FIG. 5 taken along the line C—C and viewed in the direction indicated by the arrows.

Referring to FIGS. 6 and 7, the general principle of the fibre guides 8 and component mounting points 9 is that they comprise pairs of tabs lying beside one another, each mounted in the plane of an opposite respective face of the tray 2. This is convenient in design, providing in each case a tray with the same mounting and guiding facilities on each face.

Figure 8:
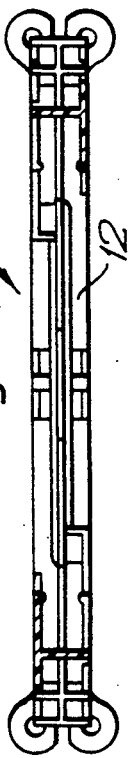
FIG. 8 shows a cross section of the tray of FIG. 5 taken along the line B—B and viewed in the direction indicated by the arrows.

Referring to FIGS. 7 and 8, it is possible to see that the centre 12 of the tray 2 of FIG. 5 is again an aperture, allowing accommodation of particularly large components if necessary.

Referring to FIG. 9, in which only a portion of the optical fibre 10 which might be stored on the tray 2 is shown, a tray 2 can be used to provide multiple mounting points for optical fibre splices 26 if this should be convenient. Such an arrangement may be particularly convenient if the tray 2 is to be used for mounting a plurality of optical fibre couplers 27 (shown only schematically) with all their associated fibre splices 26. A tray 2 having a hollow centre 12 may be converted for mounting fibre splices 26 in the centre 12 by installing a central card 28 on which the splices 26 can be mounted. Further splices 29 may also be mounted elsewhere on the tray 2, using a dedicated splice chip 30 to hold them in place.

If it is convenient, a cover (not shown) might be provided for one or other face of a tray 2. This might be convenient where a tray 2 is to be supplied to a user with components such as couplers already mounted on one face. Fibre tails from the couplers could be brought through the tray 2 to splices mounted on the opposite face of the tray 2, where they could be accessed for installation purposes by the user. The components or couplers however could be protected, for instance from mechanical damage, by a cover since it may be unlikely that the user will require to access the components themselves.

The versatility of mounting assemblies according to embodiments of the present invention is particularly useful in first installing optical equipment and fibre onto the trays of an assembly 1, then later in performing maintenance tasks. The equipment and fibre can be installed onto the trays 2 when they are in a zig-zag configuration as shown in FIG. 1b, large surface areas then being exposable. This allows layouts to be designed and carried out in a convenient manner. Subsequently it may become important to be able to access particular components for repair, maintenance or redesign. It may then be more convenient that the assembly can be opened book fashion to expose a face of a particular tray 2. This can be simply done by merely reconfiguring the hinges 3, disconnecting all those on one side of the assembly 1 and connecting those hitherto unconnected on the other side of the assembly 1, achieving a configuration as shown in FIG. 1a.

It may be desirable, once components and fibre have been installed, to reconfigure the hinges 3 and then to make them permanent in the reconfigured arrangement. This can make the assembly 1 more robust in use. For instance, by heating the end of the peg 3b of each hinge 3, a thickening can be created which prevents its extraction from the associated collar 3a. Alternatively, a nut or cap could be mounted on the end of the peg 3b.

An advantage of making hinges permanent in a reconfigured arrangement is that this can be used to prevent damage to optical fibres which are guided to lie across a hinged joint, for instance between trays.

It will be realised that electrical conductors may also be mounted on trays of an assembly. This allows electrical connections to be made for instance to supply power to opto-electronic components. The electrical conductors may be guided in the same manner as optical fibres, both in accessing a tray and in being mounted on a face of a tray.

What is claimed is:

1. A mounting assembly for optical equipment, comprising a plurality of trays which can be stacked, the trays being provided with means for mounting optical components, wherein the trays are further provided with demountable connecting hinges such that the trays can be hingedly connected together in a selected one of a plurality of different configurations.

2. A mounting assembly according to claim 1, wherein the trays are stacked, a first of the plurality of configurations allowing the trays to be accessed by opening them out zig-zag fashion and a second of the plurality of configurations allowing each face of at least one of the trays to be accessed by opening the stack of trays book fashion.

3. A mounting assembly according to claim 1, wherein each of the hinges comprises co-operating parts, first and second of the co-operating parts being mounted on different respective trays in the assembly.

4. A mounting assembly according to claim 3, wherein the first co-operating part of a hinge comprises a peg and the second co-operating part of that hinge comprises a collar.

5. A mounting assembly according to claim 4, wherein one of the co-operating parts is mounted on a resilient neck.

6. A mounting assembly according to claim 1, wherein at least one of the trays is provided with means for mounting both an optical or an opto-electronic component, and an optical fibre splice with associated spare fibre.

7. A tray for use in a mounting assembly according to claim 1, wherein the tray is provided with means for mounting at least one optical component and with means for mounting an optical fibre splice associated with that component.

8. An optical circuit mounting tray for use in an assembly of plural parallel such trays, said tray comprising:
a generally planar configuration including a first hinge structure which is connectable to a mating second hinge structure on another generally parallel tray, said tray being hingedly movable about a hinge axis substantially parallel to the tray plane when the first and second hinge structures are interconnected.

9. An optical circuit mounting tray as in claim 8 wherein said tray has eight corners, four of said corners having said first hinge structure and four of said corners having said second hinge structure which is different than said first hinge structure.

10. An optical circuit mounting tray as in claim 8 wherein said tray includes a pair of side openings respectively aligned with a pair of hinge axes, one at each opposite side of the tray.

11. An optical circuit mounting tray as in claim 8 which can be selectively connected to another similar tray for hinged motion about either of said pair of hinge axes.

12. An optical circuit mounting tray as in claim 8 wherein said tray includes predefined areas for accommodating optical devices and interconnected optical fibre.

13. An optical circuit mounting tray as in claim 8 wherein at least one of said first and second hinge structures is selectively deformable so as to make permanent a given hinged connection with another tray.

* * * * *